United States Patent [19]

Morine et al.

[11] Patent Number: 4,747,541
[45] Date of Patent: May 31, 1988

[54] DISPENSING APPARATUS

[76] Inventors: Richard L. Morine, 95 Windward Island, Clearwater, Fla. 33515; James J. Hokes, 4313 Carrollwood Village Dr., Tampa, Fla. 33624

[21] Appl. No.: 898,716

[22] Filed: Aug. 21, 1986

[51] Int. Cl.$^4$ ............................................. B05C 5/00
[52] U.S. Cl. .................................... 239/127; 239/562; 137/269; 137/625.47; 137/884; 68/205 R; 118/25; 118/313; 118/315; 118/317; 222/255; 222/318
[58] Field of Search ............... 239/124, 127, 446, 562, 239/566; 137/269, 625.23, 625.47, 884, 887; 68/205 R; 118/25, 313, 315, 317; 222/255, 266, 271, 288, 278, 279, 267, 318

[56] References Cited

U.S. PATENT DOCUMENTS

| 3,177,846 | 4/1965 | Archer et al. | 118/315 X |
| 3,332,583 | 7/1967 | Lewis | 222/255 |
| 4,545,507 | 10/1985 | Barall | 222/255 |

FOREIGN PATENT DOCUMENTS

| 792039 | 8/1968 | Canada | 137/269 |
| 14967 | of 1901 | United Kingdom | 118/25 |

Primary Examiner—Andres Kashnikow
Assistant Examiner—Mary Beth O. Jones
Attorney, Agent, or Firm—Daniel G. Blackhurst

[57] ABSTRACT

A dispensing apparatus particularly suited for dispensing oil and oil-flour mixtures in the baking industry includes a hopper for holding a quantity of the liquid to be dispensed and a plurality of positive displacement piston pumps. Separate inlet passages extend from the hopper to each of the pumps. Separate outlet passages also extend from each of the pumps. A discharge nozzle manifold having a plurality of discharge nozzles is connected to the pumps by a removable and replaceable plate-like gasket. The gasket is provided with connecting passages for connecting selected ones of the nozzles with selected pump outlet passages and diverting flow from other pump outlet passages and returning it to the hopper. The arrangement thus allows the number and pattern of dispensing nozzles in operation to be changed merely by changing the gasket without deactivating or changing the setting of the individual pumps.

16 Claims, 6 Drawing Sheets

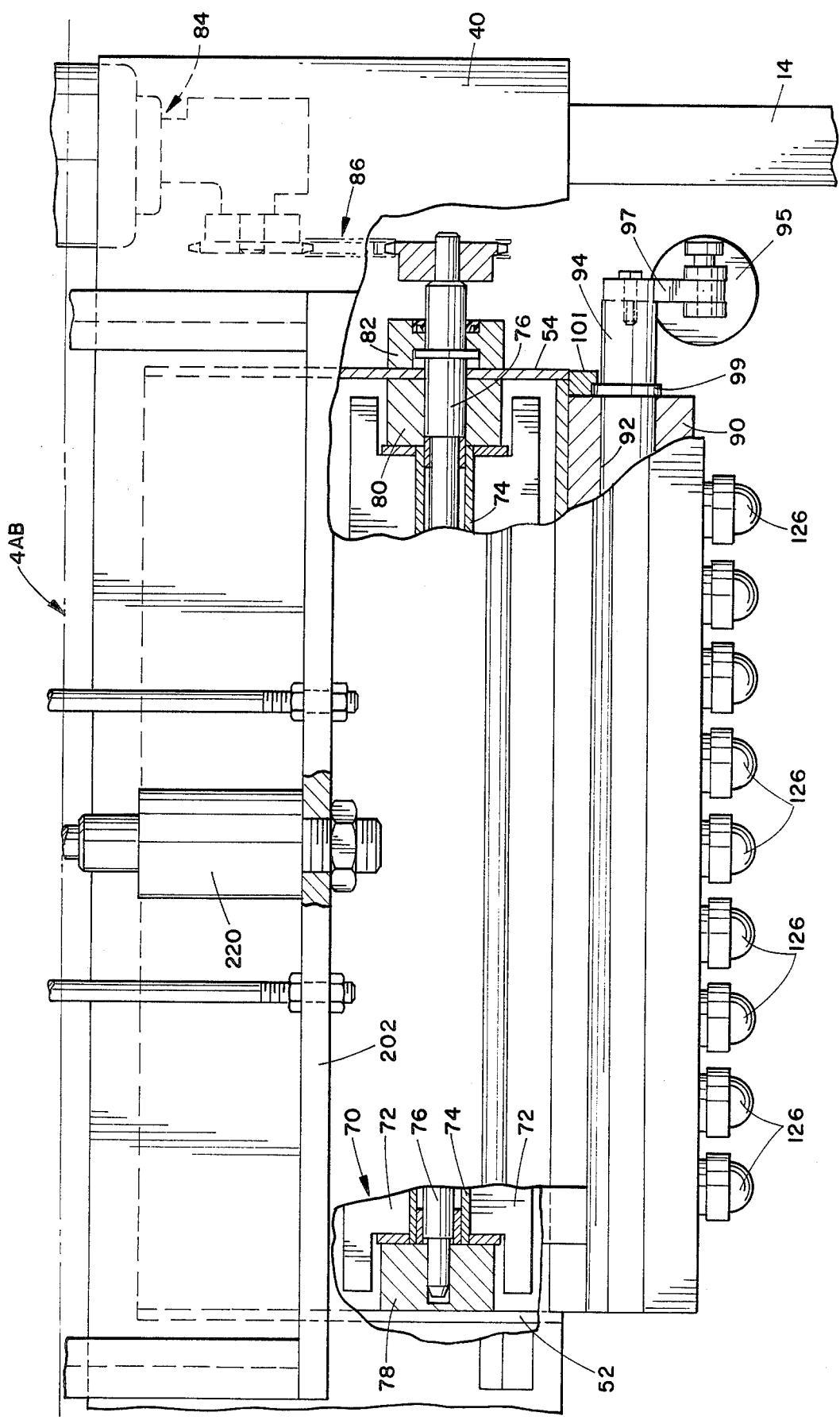

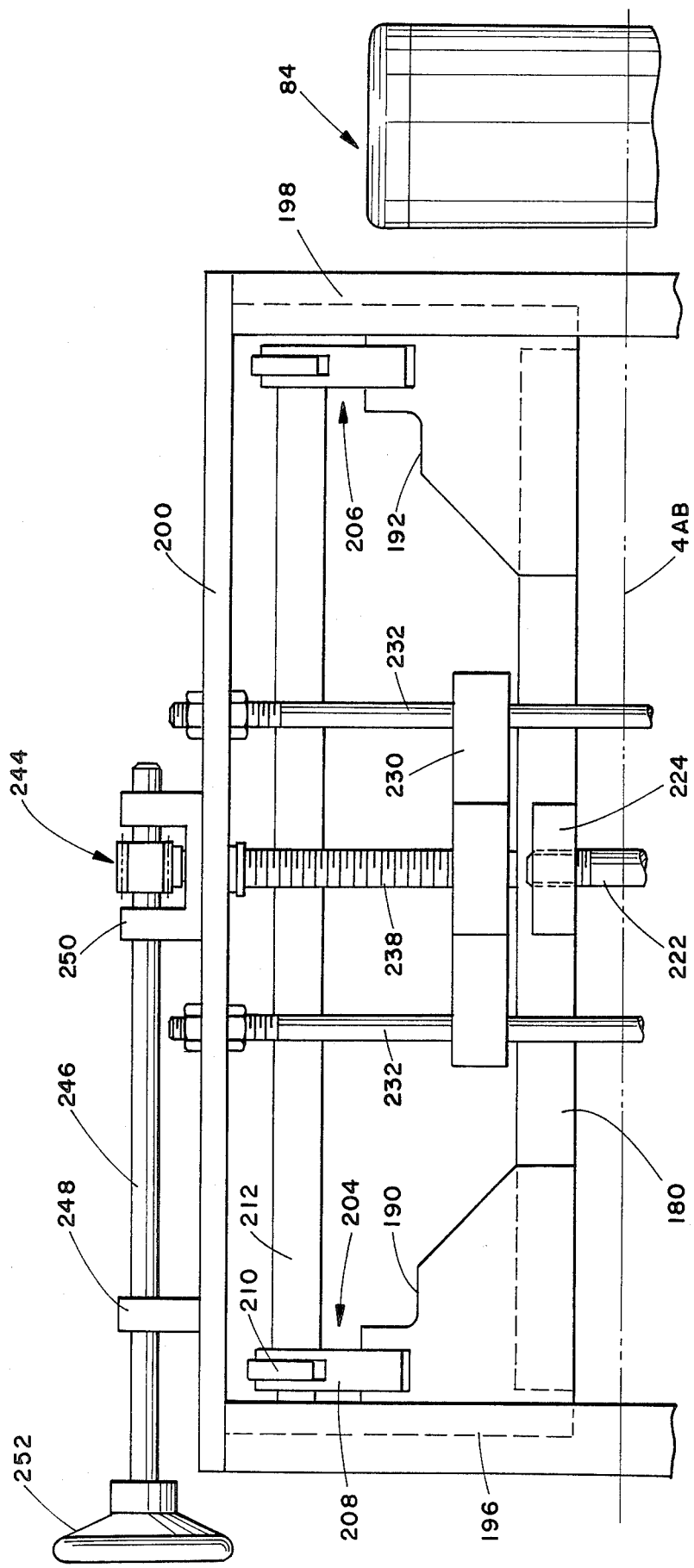

DISPENSING APPARATUS

BACKGROUND OF THE INVENTION

The subject invention is directed toward the art of liquid dispensing apparatus and, more particularly, to an apparatus for dispensing a closely controlled liquid spray or mist over a subjacent surface.

The invention is especially suited for applying an oil or grease coating to the interior surfaces of pans used in the bakery industry and will be described with reference thereto; however, it should be understood that it is capable of broader application and could be used for spraying a variety of liquids in closely metered quantities and patterns.

In the bakery industry, baking pans are commonly coated with a layer or film of oil prior to receiving the dough or batter being baked. The purpose of the oil is, of course, to prevent sticking of the product and facilitate the depanning operation.

In high production, automated baking lines the oil application has been an ongoing problem. A variety of types of direct contact, rotary disk and spray nozzle apparatus have been proposed. However, problems of nonuniform application, bare spots, plugged spray nozzles, and the like, have remained.

In addition to the noted problems, the prior equipment has been difficult to control and difficult to changeover for changes in pan sizes and spacing when different products are run on a single conveyor line.

BRIEF DESCRIPTION OF THE INVENTION

The subject invention provides a nozzle type spray apparatus which overcomes the above-noted problems and difficulties. Apparatus formed in accordance with the invention can dispense oil and oil-flour mixtures in closely controlled quantities and distribute them in very uniform continuous films. Moreover, changeover for spraying in different patterns can be accomplished readily without requiring extensive rebalancing of the pumps or nozzles.

In accordance with one aspect of the invention, the apparatus includes an elongated hopper for holding a quantity of oil or other liquid to be dispensed. Mounted from the bottom of the hopper is an elongated pump body which carries a plurality of positive displacement pump cylinders that extend upwardly into the hopper with pump pistons extending into the cylinders from within the hopper. Separate fluid inlet passages pass through the body and connect the interior of the hopper with each cylinder, and separate outlet passages connect from each cylinder to a point exteriorly of the body. Extending longitudinally of the body is a rotary valve member which alternately connects all of the inlet and outlet passages with their respective cylinders in timed relationship with the movement of the pistons. A discharge nozzle manifold assembly including a manifold carrying a plurality of spray nozzles is releasably connected to the pump body. The manifold includes separate nozzle inlet passages formed from the exterior of the manifold to each nozzle. Positioned between the manifold and the pump body is a removable connecting means for connecting selected ones of the nozzle inlet passages with the cylinder outlet passages and diverting flow from other cylinder outlet passages and returning it to the hopper.

In accordance with a more limited aspect, the connecting means is a simple, readily removable plate-like member clamped between the pump body and the manifold. By simply changing the plate-like member, the nozzles connected to their respective pumps can be varied. Thus, the spray pattern or spray area can be quickly modified without changing the operation or setting of the pumps or modifying the flow characteristics through the apparatus. The arrangement of the apparatus is such that all flow passages can be extremely short and uniform. Thus, there are little or no pressure drop differences in the various lines and flow balancing between the various nozzles is not a problem.

In addition to the above, the bypass arrangement allows all pumps to be in operation even when only selected ones of the nozzles are in operation. Thus, wear on all pumps is uniform and their outputs remain substantially equal throughout the life of the apparatus.

Accordingly, a primary object of the invention is the provision of a liquid dispensing apparatus which is capable of dispensing an extremely uniform spray and which is simple to changeover to different spray patterns.

Another object is the provision of an apparatus of the type described which has extremely short, relatively large diameter flow passages which are not subject to clogging and which do not introduce pressure balancing problems between the various nozzles.

A further object is the provision of a dispensing apparatus in which a single rotary valve element is used to control both intake and discharge from a plurality of piston pumps, as well as, to control bypass lines for each pump.

BRIEF DESCRIPTION OF THE DRAWINGS

The above and other objects of the invention will become apparent from the following description when read in conjunction with the accompanying drawings wherein:

FIGS. 4A and 4B join on match line 4AB and together constitute a view taken on line 4—4 of FIG. 3 (portions of the apparatus have been broken away to show certain interior features of construction more clearly); and, FIG. 5 is a pictorial view, partially in section, of the rotary piston assembly and an exemplary connecting element used with the subject invention.

DESCRIPTION OF A PREFERRED EMBODIMENT

Figure 1:
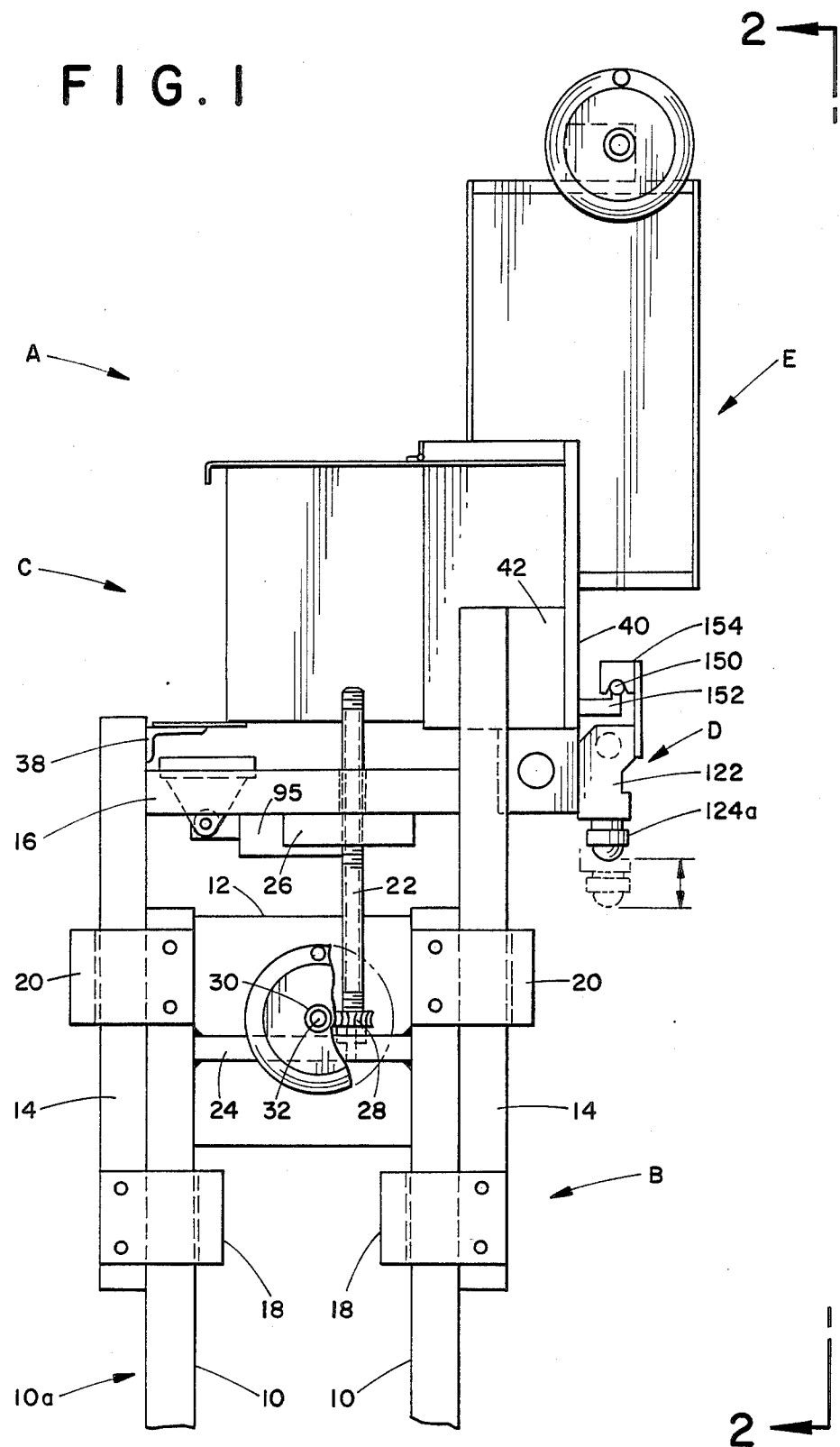
FIG. 1 is an end elevational view of a preferred embodiment of a dispensing assembly formed in accordance with the subject invention.
Figure 2:
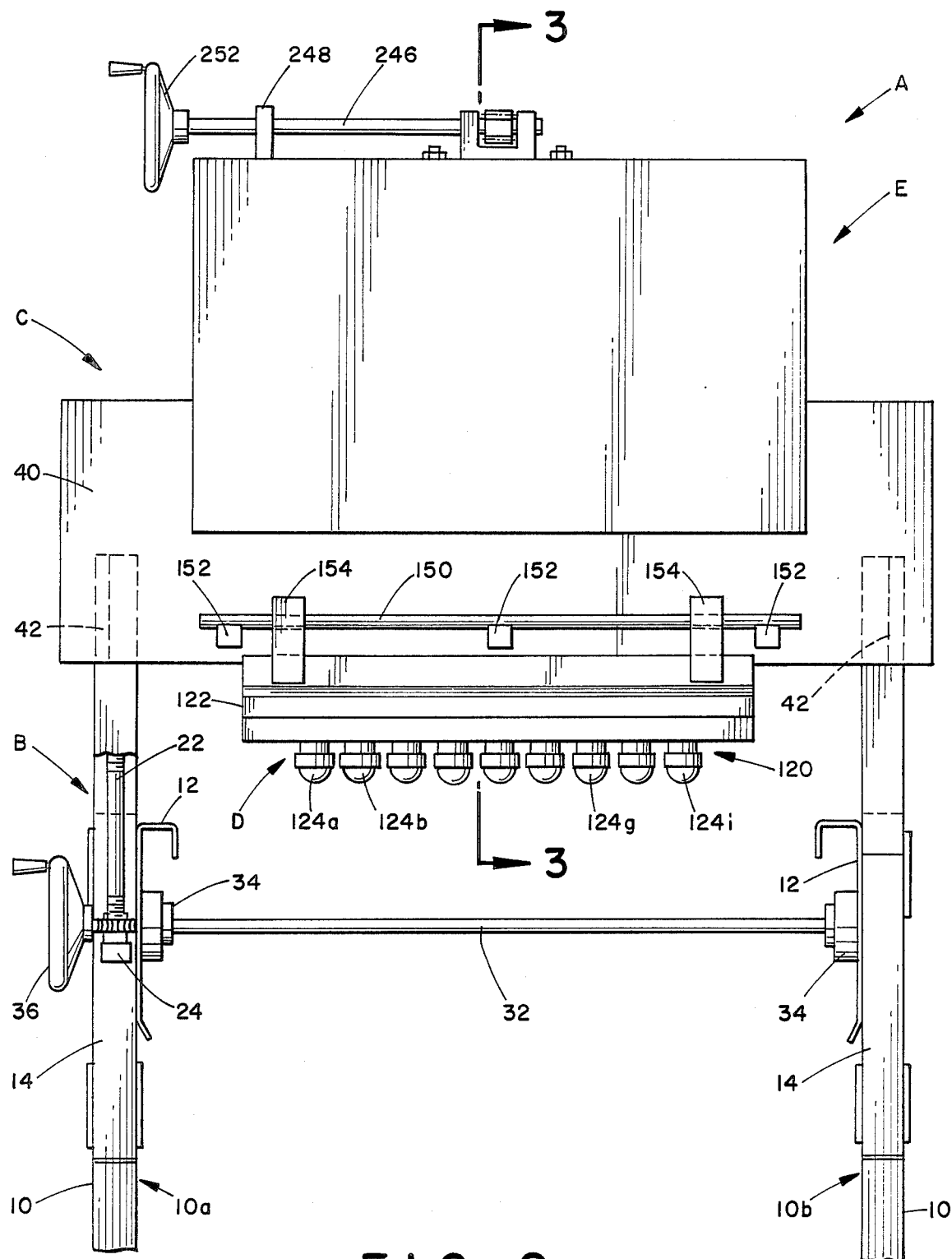
FIG. 2 is a front elevational view of the apparatus shown in FIG. 1 (the view is taken on line 2—2 of FIG. 1)
Figure 3:
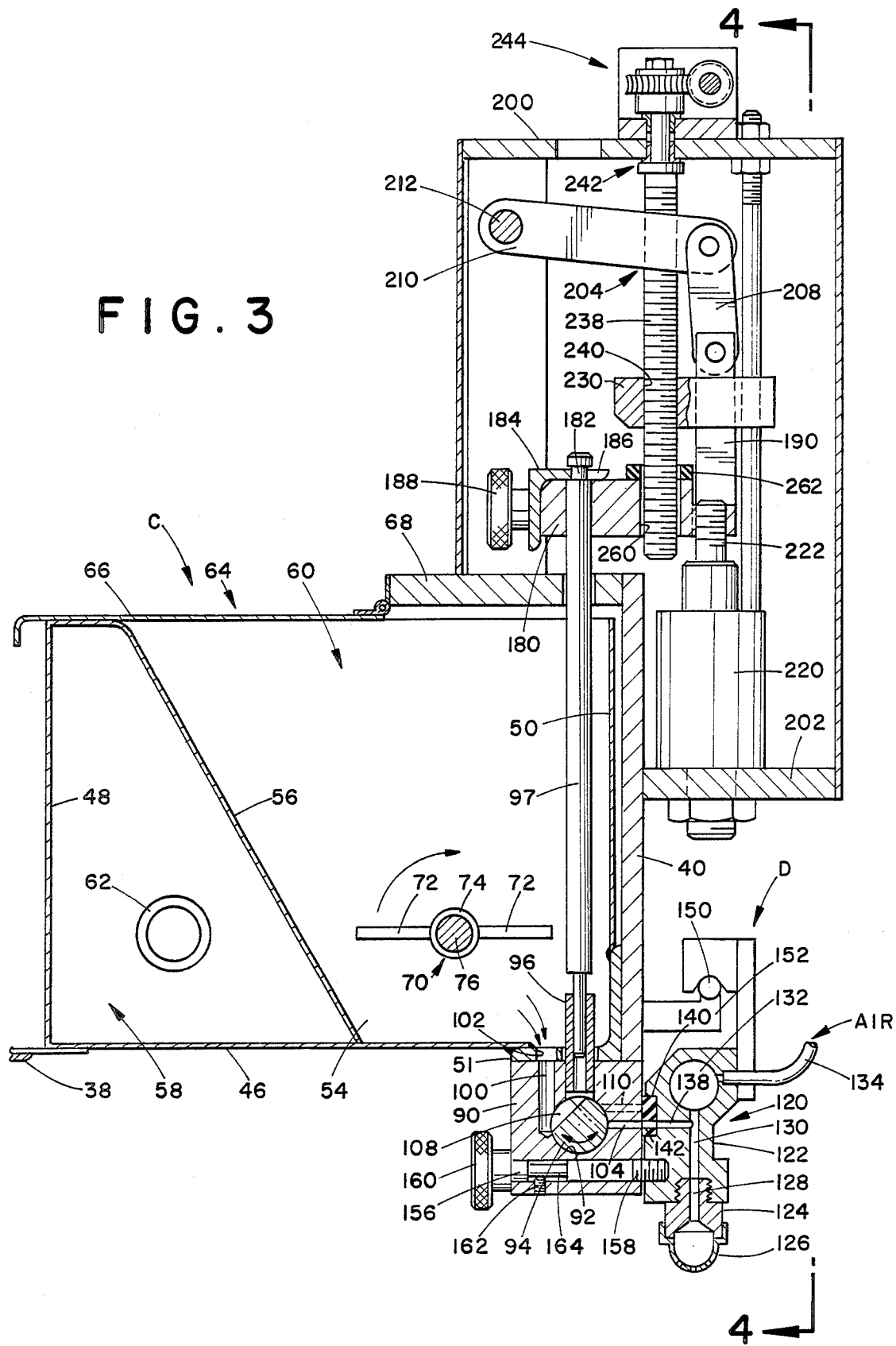
FIG. 3 is a partial cross-sectional view taken on line 3—3 of FIG. 2.

Referring more particularly to the drawings wherein the showings are for the purpose of illustrating a preferred embodiment of the invention only and not for the purpose of limiting same, FIGS. 1 through 3 show the overall arrangement of the preferred embodiment of the dispensing assembly A. In its preferred form, assembly A comprises an adjustable base or support assembly B arranged to support a hopper assembly C and its associated pump and dispensing nozzle manifold assembly D at a predetermined adjustable distance above a subjacent surface, pan, conveyor or the like (not shown). The assembly A also includes a pump drive and control assembly E which is suitably supported from the hopper assembly C.

As can be appreciated, the adjustable support assembly B could take a variety of forms. However, in the preferred embodiment, the assembly B comprises, as best shown in FIGS. 1 and 2, four vertically extending, generally rectangular legs 10 positioned in aligned, parallel pairs 10a and 10b on opposite ends of the apparatus. The legs 10 of each pair are suitably connected by transversely extending plates or frame members 12 welded or otherwise positively joined to the upper ends. Suitable cross members or braces (not shown) can also connect the lower ends of the leg pairs as required. Carried at the upper ends of the legs 10 for vertical adjustment relative thereto are additional pairs of vertical frame members 14. The upper ends of the pairs of frame members 14 are joined by a transversely extending frame member 16 suitably welded at opposite ends of the members 14. The members 14 are arranged to be vertically adjustable relative to the legs 10 by cooperating sets of generally U-shaped guide members 18 and 20, respectively. As shown, the U-shaped guide members 18 are joined to the lower ends of the frame members 14 and extend about an associated leg 10, as best shown in FIG. 1. Similarly, the U-shaped guide members 20 have their free ends connected to the upper ends of legs 10 and closely enclose the associated frame member 14. In this manner, each pair of legs 10 and the associated frame members 14 are held in closely guided relative relationship while being free to be adjusted vertically.

In the subject embodiment, vertical adjustment of the frame members 14 relative to the associated legs 10 is accomplished by a pair of drive screws 22. One of the screws 22 extends upwardly from each pair of legs 10a, 10b as best shown in FIG. 2. As shown therein, the lower ends of the drive screws 22 are suitably supported for free rotation in a generally rectangular support bar 24 connected between the upper ends of legs 10. At their upper threaded end, each drive screw 22 extends through a suitable threaded support block 26 carried on the under surface of each cross support member 16. By rotation of the drive screws 22, it is possible to selectively adjust the position of the frame members 14 relative to legs 10. Many different arrangements could be used for driving the adjusting screws 22; however, in the subject embodiment, the screws 22 are simultaneously driven through worm wheels 28 connected to the lower ends of each drive screw 22 and simultaneously driven by suitable worm gears 30 carried on a horizontally extending drive shaft 32 (see FIG. 2). As shown in FIG. 2, the shaft 32 is mounted in suitable bearings 34 carried from the transverse frame members 12. Rotation of the drive shaft 32 is accomplished through a conventional crank wheel 36 carried at the left-hand end of shaft 32 as viewed in FIG. 2.

As best shown in FIGS. 1 and 3, the hopper assembly C is supported from the upper ends of the frame members 14 by suitable horizontally extending cross frame members. Specifically, a first angle member 38 extends between the top ends of the two rear frame members 14 whereas a relatively heavy vertically extending plate 40 is joined to the upper ends of the two forward frame members 14 by end plates 42 which connect between the plates 40 and the associated forward support or frame member 14. The hopper assembly C is, as best shown in FIG. 3, formed of sheet metal or other suitable material and includes a bottom wall 46 and a pair of vertically extending rear and front walls 48 and 50, respectively. End walls 52 and 54 (see FIG. 4) seal the ends of the hopper. An interior wall extends longitudinally of the hopper to divide it into a first chamber portion 58 and a second chamber portion 60. Chamber 60 is designed to hold the oil or oil and flour mixture which is to be dispensed through the pump and nozzle assembly D. On the other hand, the chamber 58 is arranged to serve as a temperature control chamber for maintaining the fluid in chamber 60 at a predetermined desired temperature. Chamber 58 could be provided with many different types of heating means such as an electric heater 62 or a suitable supply of steam or heated water. Many different types of conventional control means (not shown) could be provided for regulating the heating means.

The chamber portion 60 has a generally open upper end 64 covered by a hinged cover 66. Cover 66 is joined (as shown in FIG. 3) to the rear edge of a transversely extending support or frame member 68 which is joined to and extends rearwardly from the upper end of frame member 40.

Preferably, chamber portion 60 is provided with an agitator or mixer 70 to maintain the oil or oil and flour mixture within the chamber suitably mixed and in a desired condition for dispensing. As best shown in FIG. 4, the agitator 70 comprises a pair of blades 72 suitably connected to a sleeve or tube 74. Tube 74 is, in turn, carried by and drivingly connected to a rotatably mounted shaft 76 (see FIG. 4A). In the embodiment shown, the left-hand end of shaft 76 is carried in a bearing block 78 connected to the interior of chamber wall 52. The right-hand end of the shaft 76 extends through the end wall 54 and is mounted in a bearing block 80. A thrust bearing and seal assembly 82 are mounted on the exterior of wall 54.

The agitator assembly 70 is arranged to be selectively rotated from an electric motor and right angle drive assembly 84 carried from the frame member 40 and drivingly connected to the outer end of shaft 76 through a suitable chain drive 86.

Figure 5:
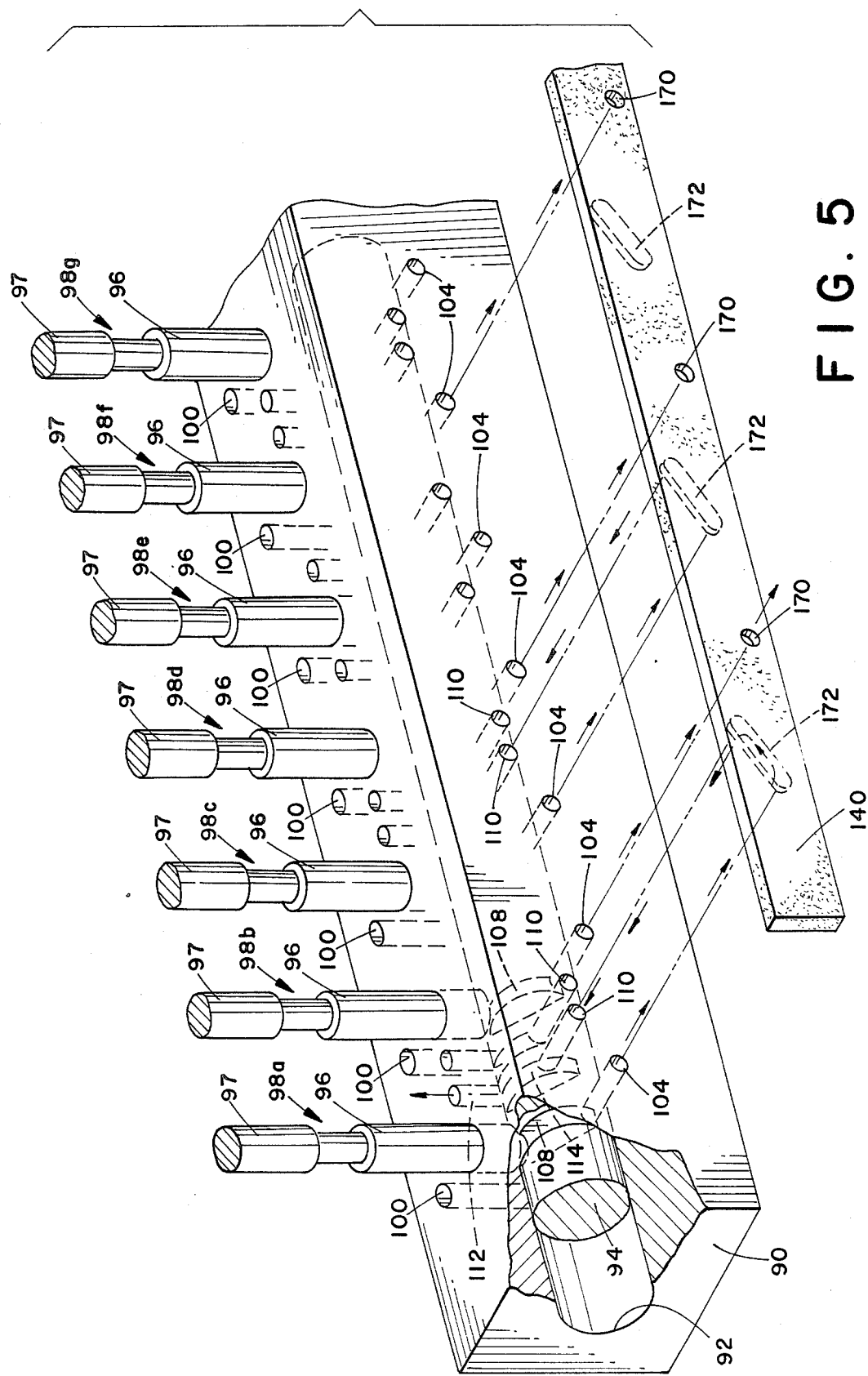

Referring again to FIG. 3, it will be noted that the pump and nozzle assembly D is suitably carried from the frame member 40 and the angle member 51 which defines the forward lower corner of the hopper assembly C. The pump portion of the assembly D comprises an elongated, generally rectangular pump housing or body 90 which is defined by an elongated metal member suitably connected to the lower surface of angle 51 and the bottom of frame member 40. The housing 90 has a cylindrical horizontally extending central bore 92 which defines a valve chamber and is sized to closely and slidably receive a cylindrical, rotary valve shaft 94. Referring to FIG. 5, it will be noted that the housing member 90 also carries a plurality of vertically extending, longitudinally spaced sleeve members 96. The sleeve members 96 define the pump chambers for a plurality of individual piston pumps units 98 which are differentiated for the purpose of subsequent discussion by the addition of letter subscriptions. Each of the cylinders 96 is mounted in general alignment with the valve chamber 92 as shown in FIGS. 3 and 5. The number of individual piston pump assemblies 98 could vary substantially within the scope of the invention. In the preferred embodiment, however, nine such pump assemblies are provided at equally spaced locations along the housing 90, although only seven are shown in the partial pictorial view of FIG. 5. Additionally, associated with each of the pump units 98 are separate vertically extending inlet passages 100. As best shown in FIG. 3, each passage 100 has its upper end connected through an opening 102 in the angle 51 with the interior of the liquid chamber 54. The lower end of each inlet passage 100 opens generally tangentially to the valve chamber 92. Also intersecting with the valve chamber 92 and generally transversely aligned with each inlet passage 100 is a separate discharge passage 104. In the embodiment shown, the passages 104 extend horizontally to alignment with the outer or right-hand face (as viewed in FIG. 3) of the housing 90.

At the locations corresponding to the locations of each inlet 100 and outlet 104, the valve member or valve shaft 94 is provided with a chordal slot 108 formed as best seen in FIGS. 3 and 5. The slots 108 are, as mentioned, positioned to be in alignment with each pair of inlets 100 and outlets 104 and their associated piston pump assembly 98. Referring in particular to FIG. 3, it will be noted that when the valve shaft 92 is rotated to move the slots 108 to the position shown in solid lines, the slots 108 connect each respective inlet 100 with the pump chamber defined by the associated sleeve member 96. Thereafter, as the pistons 97 are reciprocated vertically upward, the fluid from the chamber 54 is drawn through the inlet into the pump chamber. When the piston 97 is at the upper extent of its stroke, the valve shaft 94 is rotated clockwise approximately 90 degrees so that the chordal slots 108 assume the dotted line position shown in FIG. 3. Thus, each separate piston chamber is connected through the associated chordal slot 108 with its associated outlet or discharge line 104. Thereafter, downward reciprocation of the pistons 97 expels the fluid in the pump chamber through the respective outlets 104.

The particular means used to oscillate the valve shaft 94 in timed relationship with the pumps is not important to the invention, but is shown as an air cylinder 95 suitably connected with the end of shaft 94 through a crank arm 97 (see FIG. 4A). Also, it should be noted that shaft 94 is removably held in position in bore 92 by a collar 99 connected to shaft 94 and engaged by a removable bracket 101.

In accordance with the subject invention, and for reasons which will subsequently be described at some length, each of the piston pump assemblies 98 is associated with a valve bypass arrangement. Specifically, as best shown in FIG. 5, each of the valved bypassses includes a first bypass passage section 110 which extends horizontally inward from the forward or discharge face of the housing 90 and opens into the valve chamber 92. Each valved bypass further includes a second bypass passageway section 112 which extends vertically upward from the valve chamber in alignment with its associated first bypass passageway section 110. At least one pair of bypass sections 110 and 112 are associated with each of the piston pump assemblies 98. In addition, the valve shaft 94 is provided with chordal slots 114 which align with the individual sets of bypass passageway sections 110 and 112. The chordal slots 114 are oriented the same as the previously discussed slots 108. That is, when the valve shaft 94 is rotated to the dotted line position of FIG. 3 and the solid line position of FIG. 5, the bypass passageway sections 110 and 112 are connected in flow relationship through their associated chordal slot 114. The importance of this relationship will subsequently be described in conjunction with the discussion of the discharge nozzle portion of the pump and nozzle assembly D.

Referring specifically to FIGS. 2 and 3, it will be seen that a nozzle assembly 120 is releasably connected to the forward or right-hand face of the housing 90 as viewed in FIG. 3. In the embodiment under consideration, the nozzle manifold assembly 120 comprises an elongated manifold body 122 which carries a plurality of spray nozzles 124.

The nozzle members 124 are conventional spray nozzles and are threadably received in the lower face of the manifold body 122. As best shown in FIG. 2, the number and spacing of nozzles 124 corresponds to the number and spacing of the pump assemblies 98. That is, in the subject embodiment, there are nine nozzles 124 arranged to be in general alignment with each of the piston pump units 98. Referring again to FIG. 3, it will be seen that each nozzle 124 includes a suitable spray head 126. It should be appreciated that the design of the spray heads 126 can be varied to produce spray patterns to suit various needs.

Each spray nozzle 124 includes a separate internal passageway 128 which connects with an associated vertical bore 130 formed in the manifold body 122. In the embodiment under consideration, the vertically extending bores 130 connect with a horizontally extending air chamber 132 formed longitudinally of the manifold body 122 and sealed at its opposite end to provide a closed air chamber. Air under suitable pressure is supplied through a line 134 with the interior of the bore 132 to assist in expelling the oil or oil-flour mixture through the nozzle heads.

Intersecting each of the vertical bores 130 is an associated horizontally extending flow passage 138. Each of the passages 138 is positioned to align with a respective one of the discharge passages 104. The passages 138 communicate with the passages 104 through an elongated, plate-like gasket member 140 received in a longitudinally extending slot 142 extending the length of the manifold body 122. The plate-like gasket member 140 is formed from any suitable material, such as nylon or the like, and functions to provide a connecting and seal means between the pump housing 90 and the manifold 122.

As mentioned earlier, the manifold 122 is preferably releasably connected to the pump housing 90. Many different types of readily releasable connecting means could be provided; however, in accordance with the subject embodiment, the manifold 122 is, as best seen in FIGS. 2 and 3, supported from a horizontally extending bar 150 which is carried by suitable brackets 152 extending outwardly from frame member 40. The manifold 122 is releasably suspended from the rod 150 by hook-like members 154 which have their lowermost ends positively adjoined to the manifold 122. As shown in FIG. 3, the manifold body 122 is also releasably clamped to the outer face of the pump housing 90 by a suitable number of manually operable screw members 156 which extend through the lower portion of the pump housing 90. The screw members 156 have a threaded outer end 158 which is adapted to be received in correspondingly formed threaded openings in the manifold body 122. Each shaft 156 also preferably includes a suitable manually operable handle 160 for tightening. In addition, each of the screw members 156 is preferably retained in position in the body while being permitted to have free rotation and limited longitudinal movement by a set screw 162 which extends upwardly from the bottom of the body or housing 90 into sliding engagement with a reduced diameter portion 164 formed on the associated screw rod 156. As can be appreciated, tightening of the screw members 156 causes the manifold member 122 to be tightly clamped to the pump housing 90 and the plate-like gasket member 140 to be sealingly clamped between the housing 90 and the manifold 122. Conversely, by untightening the screw rod 156, the plate-like gasket member 140 is unclamped and, as can be appreciated, can be slid longitudinally out of its confined position between the pump housing 90 and the manifold 122 without totally removing the manifold 122.

The arrangement thus far described offers substantial advantages in that it is possible to quickly change the number and arrangement of nozzles 124 that are operating without changing the operation of the associated pumps 98. Specifically, and in accordance with the invention, the discharge pattern can be varied merely be changing the plate-like gasket member 140. In particular, and as can best be understood from FIG. 5, by simply varying the construction or passageway design of the plate-like gasket members 140, the number or position of the spray nozzles in use can be quickly varied. For example, the gasket 140 shown in FIG. 5 is arranged so that only the individual nozzles in association with pump assemblies 98B, 98D, and 98F are in operation. In particular, note that the gasket 140 is provided with through openings 170 which connect the outlet passages 104 from the pumps 98B, 98D, and 98F with the associated passageways 138. The outlets from pumps 98A, 98C, and 98E are, on the other hand, arranged to be connected directly back to their associated bypass passageway member section 110. For this reason, the plate-like gasket member 140 is provided with suitable recesses or connecting passages 172 which extend inwardly from the inner face of gasket 140 and provide a sealed flow passage from certain of the discharge passages 104 directly to the associated bypass passage. Accordingly, it can be appreciated, all of the pump units 98A continue to operate normally without changing the setting or adjustment of any of the pump. By providing a variety of members 140 with differing arrangements of through openings 170 and bypass recesses 172, a variety of spray patterns can be achieved.

Many different types of drive and adjustment assemblies could be used for actuating the piston pumps 98. The preferred assembly used in the subject embodiment can best be understood by reference to FIGS. 3 amd 4. Specifically, as shown therein, all of the piston rods 97 extend vertically upward freely through openings in the frame member 68. At their upper ends, the shafts 97 are releasably connected to a horizontally extending main drive bar or member 180. In particular, the upper ends of each of the shafts 97 are provided with a reduced diameter section 182 which is located immediately above the drive bar 180. A suitable angle member 184 is provided with inwardly extending slots 186 adapted to closely receive the reduced diameter portion 182. The angle member 184 is releasably held in position on the drive bar 180 by suitable thumbscrews or the like 188.

The drive bar 180 is constrained to have uniform vertical movement by end bracket members 190 and 192 which are joined to the face of bar 180. The end bracket members 190 and 192 have their outer free ends closely received in vertically extending guide channels 196 and 198, respectively. The guide channels are supported between a top plate 200 and a bottom plate 202. As best shown in FIG. 3, the bottom plate 202 is joined to the frame member 40 and extends laterally therefrom. In addition to the guide tracks and 196 and 198, the drive member 180 is constrained to have constant parallel movement by end linkages 204 and 206. Linkages 204 and 206 are identical, accordingly, only linkage 204 will be described in detail. In particular, linkage 204 includes a first link member 208 which is pivotally connected to the upper end of the guide bracket 190. The opposite end of linkage 208 is pivotally connected to a link member 210. At its opposite end, link member 210 is positively connected to a horizontally extending torsion bar member 212 which has its outer ends rotatably supported in suitable bearings (not shown) mounted on vertically extending frame members which extend upwardly from plate or frame member 68. As can be appreciated, the link assemblies 204 and 206 require the ends of the drive member 180 to move simultaneously.

Many different drive or power means could be used for reciprocating the drive member 180 vertically. In the subject embodiment, however, the drive means comprise an air cylinder 220 which is carried from plate or frame member 202 with its piston rod 222 drivingly connected to drive member 180 through a suitable bracket 224. As can be appreciated, the air cylinder 220 is, however, driven in timed relationship with the oscillation of valve shaft 94 by conventional controls not shown.

By varying the stroke of the pistons 97, the quantity of material dispensed or discharged can, of course, be varied. In the subject embodiment, the stroke of the pistons 97 can be adjusted by selective positioning of a horizontally extending stop bar 230. As shown in FIGS. 3 and 4, the stop bar 230 is adjustably mounted on a pair of vertically extending guide rods 232 which are connected between the frame member 202 and the top frame member 200. The guide rods pass freely through suitable openings formed in the stop bar 230 to thereby guide the stop bar while permitting it to be adjusted in vertical directions. The means for vertically adjusting the stop bar 230 comprise a vertically extending adjustment screw 238 which depends from the top plate 200. The threaded body portion of adjustment screw 238 passes through a suitable threaded opening 240 in stop bar 230. At its upper end, the adjustment screw is supported and rotatably mounted in a suitable bearing assembly 242 carried in plate 220. Selective rotation of the adjustment screw 238 is provided by a worm gear assembly 244 actuated through a horizontally extending shaft 246. The shaft 246 is, of course, rotatably mounted in brackets 248 which are carried on the top of top plate 200. A conventional hand wheel 252 is joined to the outer left-hand end of shaft 246 for selective manual actuation.

Referring again to FIG. 3, it will be noted that the lower end of the adjustment screw 238 extends freely through an opening 260 formed in the stop bar 180. Positioned about the opening 260 on the upper surface of stop bar 180 is a stop member 262. As can be seen, the upward limit of movement of the drive bar 180 is determined by engagement between the stop member 262 and the adjustable stop bar 230. By varying the position of the stop bar 230, the upward limit of movement of the drive member 180 and its associated pistons can be adjusted to vary the quantity of material dispensed by the pump assemblies 98.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A liquid dispensing apparatus comprising:
a source of liquid;
pump housing means including a plurality of positive displacement pumps each including a cylinder and a reciprocated piston; means for simultaneously reciprocating all of said pistons; separate inlet and outlet passages for each of said cylinders, said inlet passages connected to said source of liquid and said outlet passages connected to the exterior of said pump housing means;
a valve means for alternatively connecting said inlets and outlets with their respective cylinder in timed relationship with the movement of their respective piston;
a discharge nozzle manifold assembly including a manifold member carrying a plurality of discharge nozzles and separate nozzle inlet passages formed from the exterior of said manifold to each of said discharge nozzles;
means for releasably attaching said manifold to said pump housing means; and,
removable connecting means in the form of a plate-like gasket member positioned between said pump housing means and said manifold and defining connecting passages for selectively connecting selected ones of said cylinder outlet passages with selected ones of said nozzle inlet passages and diverting flow from other selected said cylinder outlet passages and returning it to said source of liquid to permit the number and pattern of said discharge nozzles in use to be selectively varied without varying the operation of said pumps.

2. The liquid dispensing apparatus of claim 1 wherein said valve means comprises a rotary valve member extending longitudinally of said pump housing means.

3. The liquid dispensing apparatus of claim 1 including bypass passages extending from said source of liquid through said pump housing means.

4. The liquid dispensing apparatus of claim 3 wherein the flow returned to said source of liquid by said connecting means is conducted through said bypass passages.

5. The liquid dispensing apparatus of claim 3 wherein said bypass passages are controlled by said valve means.

6. A liquid dispensing apparatus comprising:
a hopper for holding a quantity of liquid to be dispensed;
an elongated body carried from said hopper;
a plurality of positive displacement pumps including cylinders extending from said body into said hopper and pistons extending into said cylinders from within said hopper;
means for simultaneously reciprocating said pistons;
separate inlet passages extending from said hopper through said body to the interior of each of said cylinders and separate outlet passages extending from each of said cylinders through said body to a point exteriorly of said body;
a rotary valve means extending longitudinally of said body for alternately connecting all of said inlet and outlet passages with their respective cylinder in timed relationship with the movement of their respective piston;
a discharge nozzle manifold assembly including a manifold member carrying a plurality of discharge nozzles and separate nozzle inlet passages formed from the exterior of said manifold to each of said discharge nozzles; and,
selectively removable and replaceable connecting means positioned between said body and said manifold and having predetermined connecting passages extending therethrough for connecting selected ones of said nozzle inlet passages with said cylinder outlet passages and diverting flow from other said cylinder outlet passages and returning it to said hopper to permit the number and pattern of said discharge nozzles in use to be selectively varied without varying the operation of said pumps.

7. The apparatus as defined in claim 6 wherein said body includes bypass passages extending therethrough from said hopper to the exterior of said body and wherein the diverted flow is conducted through said bypass passages.

8. The apparatus as defined in claim 6 wherein said rotary valve means includes means for controlling flow through said bypass passages.

9. The apparatus as defined in claim 6 wherein said manifold member includes means for conducting air to said discharge nozzles.

10. A liquid dispensing apparatus comprising:
a hopper for holding a quantity of liquid to be dispensed;
an elongated body carried from said hopper;
a plurality of positive displacement pumps including cylinders extending from said body into said hopper and pistons extending into said cylinders from within said hopper;
means for simultaneously reciprocating said pistons;
separate inlet passages extending from said hopper through said body to the interior of each of said cylinders and separate outlet passages extending from each of said cylinders through said body to a point exteriorly of said body;
a rotary valve means extending longitudinally of said body for alternately connecting all of said inlet and outlet passages with their respective cylinder in timed relationship with the movement of their respective piston;
a discharge nozzle manifold assembly including a manifold member carrying a plurality of discharge nozzles and separate nozzle inlet passages formed from the exterior of said manifold to each of said discharge nozzles;
removable connecting means positioned between said body and said manifold for connecting selected ones of said nozzle inlet passages with said cylinder outlet passages and diverting flow from other said cylinder outlet passages and returning it to said hopper;
said body further including bypass passages extending therethrough from said hopper to the exterior of said body and wherein the diverted flow is conducted through said bypass passages; and
said removable connecting means comprising a plate member having connecting passages formed therein, some of said connecting passages connecting some of said cylinder outlet passages to said bypass passages.

11. The apparatus as defined in claim 10 wherein said plate member is formed of a resilient plastic and is clamped between said body and said manifold.

12. The apparatus as defined in claim 11 wherein said manifold is releasably clamped to said body.

13. A liquid dispensing apparatus comprising:
a source of liquid;
pump housing means including a plurality of positive displacement pumps each including a cylinder and a reciprocated piston; means for simultaneously reciprocating all of said pistons; separate inlet and outlet passages for each of said cylinders, said inlet passages connected to said source of liquid and said outlet passages connected to the exterior of said pump housing means;
a valve means for alternately connecting said inlets and outlets with their respective cylinder in timed relationship with the movement of their respective piston;
a discharge nozzle manifold assembly including a manifold member carrying a plurality of discharge nozzles and separate nozzle inlet passages formed from the exterior of said manifold to each of said discharge nozzles;
means for releasably attaching said manifold to said pump housing means; and,
connecting means removably associated with said pump housing and positioned between said pump housing means and said manifold and defining connecting passages for selectively connecting selected ones of said cylinder outlet passages and returning it to said source of liquid to permit the number and pattern of said discharge nozzles in use to be selectively varied without varying the operation of said pumps.

14. The apparatus as defined in claim 13 including a plurality of by-pass passages controlled by said valve means and wherein said connecting means connects selected ones of said cylinder outlet passages with selected ones of said by-pass passages.

15. The apparatus as defined in claim 14 wherein said connecting means define passages for connecting selected ones of said cylinder outlet passages with selected ones of said by-pass passages and wherein said by-pass passages open to said source of liquid.

16. The apparatus as defined in claim 15 wherein said valve means opens and closes said by-pass passages in timed relationship with reciprocation of said pistons.

* * * * *